United States Patent [19]
Piccinino, Jr.

[11] Patent Number: 5,996,653
[45] Date of Patent: Dec. 7, 1999

[54] VALVE ASSEMBLY AND APPARATUS

[75] Inventor: Ralph L. Piccinino, Jr., Rush, N.Y.

[73] Assignee: Eastman Kodak Company, Rochester, N.Y.

[21] Appl. No.: 09/168,780

[22] Filed: Oct. 8, 1998

[51] Int. Cl.$^6$ .................................................. B65B 1/04
[52] U.S. Cl. .......................................... 141/346; 141/351
[58] Field of Search ..................................... 141/346, 347, 141/351, 363, 364; 222/501, 518, 325; 137/641.03, 614.04

[56] References Cited

U.S. PATENT DOCUMENTS

| | | | |
|---|---|---|---|
| 3,199,831 | 8/1965 | Sully | 141/349 |
| 5,467,806 | 11/1995 | Stricklin et al. | 141/346 |
| 5,609,195 | 3/1997 | Stricklin et al. | 141/351 |
| 5,694,991 | 12/1997 | Harris et al. | 141/346 |
| 5,725,034 | 3/1998 | Fry et al. | 141/347 |

*Primary Examiner*—David J. Walczak
*Attorney, Agent, or Firm*—Frank Pincelli

[57] ABSTRACT

A valve assemblage for controlling flow of fluid between a first fluid system and a second fluid system. The first fluid system includes a first valve assembly adapted to mate and engage a second valve assembly on the second fluid system. The first valve assembly comprising a proboscis member having a channel having, an inlet end to receive fluid and an outlet end to deliver the received fluid to the first fluid system. A blocking member is provided which is movable relative to proboscis member from a first position closing the at least one entrance port end to a second position opening the at least one entrance port, and a first spring member normally biasing the blocking member to the position closing the at least one entrance port. A first annular sealing member positioned above the at least one entrance port and at least two spaced seal annular sealing members disposed below the at least one entrance port which provide a fluid tight seal between the proboscis member and the second valve assembly. The second valve assembly includes a body member, a fluid inlet port in the body to receive fluid from the second fluid system, a piston slidable within a body member from the first position closing the inlet port, to a second position opening the closed inlet port in a first spring member normally biasing the piston to the first position.

12 Claims, 7 Drawing Sheets

VALVE ASSEMBLY AND APPARATUS

FIELD OF THE INVENTION

The present invention relates to a valve assemblage and apparatus incorporating the valve assemblage. More particularly, the invention concerns a valve assemblage for controlling the flow of a fluid between a container and a mating fluid system which uses the fluid, such as a chemical replenishment container and a photoprocessing or photoprinting machine, substantially without exposing the user to such fluid.

BACKGROUND OF THE INVENTION

Flow control devices, such as valves, are widely used for regulating the flow of materials, primarily fluids, from one containerized system to another. A conventional way to supply a fluid material to a containerized system, such as a photoprocessing machine, involves dispensing the fluid material from a receptacle, for example, a flexible container, into a fluid reservoir or distribution channel in the photoprocessing machine. In such applications, the fluids typically are liquid chemicals. The flexible containers or bottles currently used to replenish chemicals in these machines often require that the user first open the container and then pour the contents into the photoprocessing machine. One problem that results during the transfer of the chemicals is leakage. Chemical leakage, of course, exposes the operator to potential harmful effects of the material. Waste of chemicals and associated cost are related problems of the present systems. These shortcomings necessitate a need to supply materials, such as photographic chemicals to photoprocessing machines, and the like, in a containerized system and without leakage. Such systems would then present to the operator as a dripless or dry transfer system.

Consequently, a need has existed in the prior art to provide a dry system for transferring a fluid from a containerized system. Preferably, in such a system, a flow control or valving arrangement would communicate with both fluid systems (e.g. a flexible container for photographic chemicals and the photoprocessing machine) and would be utilized such that when the containerized system is removed, the valving arrangement would close and the user would not be exposed to leakage.

U.S. Pat. No. 5,694,991 discloses a valve assembly that eliminates leakage during fluid transfer between mating the container of mating fluid containerized systems in which the user does not have to open either of the containerized systems prior to transferring of fluid. The valve assembly includes a first member associated with a first fluid system and a second valve member associated with a second fluid system. While this method of assembly provides a system with little or no leakage between the mating systems, a leakage problem may develop when the two fluid systems are brought together for transferring of the fluid. If there exists axial misalignment between the two members, this misalignment can result in potential minor leakage between the two mating parts. Additionally, if either of the members is slightly irregular in shape, this could also add to the potential of small leaks. Further, since one of the members is designed as a permanent installation on an apparatus wherein the member will be subjected to many repeated engagements and disengagements, it is important that the longevity of the permanently mounted mating member be designed such that it withstand repeated use.

In a typical system, one of the containerized systems comprises a container having a liquid such as a photosensitive processing liquid, which is then designed to mate with a fluid system provided in a photographic processing apparatus, for example, a minilab, when liquid is supplied as required. Typically, the processing apparatus will also include a containerized system for storing of the fluid to be transferred. Thus, the valve assembly installed on the minilab will experience many repeated uses while the fluid supply container will be used only once.

Thus, there is a need to provide a valve assembly whereby potential fluid leaks are minimized and is durable so as to allow repeated engagements and disengagements of the valve assemblies.

SUMMARY OF THE INVENTION

In accordance with one aspect of the present invention there is provided a valve assemblage for controlling the flow of fluid between a first fluid system and a second fluid system. The second fluid system contains a fluid to be dispensed to the first fluid system. The first fluid system includes a first valve assembly adapted to mate and engage a second valve assembly on the second fluid system. The first valve assembly comprising a proboscis member having a channel, an inlet end to receive fluid and an outlet end to deliver the received fluid to the first fluid system. The inlet end is positioned at a first end portion of the proboscis member and has at least one entrance port. The first valve assembly further includes a blocking member movable relative to proboscis member from the first position closing the at least one entrance port end to a second position opening the at least one entrance port, and a first spring member normally biasing the blocking member to the position closing the at least one entrance port. A first annular sealing member is provided above the at least one entrance port and at least two spaced annular sealing members are disposed below the at least one entrance port. The second valve assembly includes a body member, a fluid inlet port in the body to receive fluid from the second fluid system, a piston slidable within a body member from the first position closing the inlet port to a second position opening the closed inlet port, and a second spring member normally biasing the piston to the first position. When the first and second valve assemblies are urged toward each other, the body member of the second valve assembly engages and moves the blocking member thereby opening the inlet end of the proboscis member, and the proboscis member displaces the piston into the position opening the entrance port, the opened entrance port then being in fluid communication with the opened inlet end, thereby forming an open fluid flow channel between the first fluid system and the second fluid system. When the first and second valve assemblies are moved away from each other, the body member is withdrawn from the proboscis member, the blocking member moves to close the inlet end, and the proboscis member disengages from the piston to allow the piston to slide to the position closing the entrance port, thereby preventing flow of fluid between the first and second systems.

In accordance with another aspect of the present invention there is provided an apparatus having a first fluid system having a first valve assembly adapted to engage a second valve assembly of a second fluid system for transferring fluid from the second fluid system to the first fluid system. The first valve assembly comprises a proboscis member having a channel, an inlet end having an entrance port to receive fluid from the second valve assembly and an outlet end to deliver the received fluid to the first fluid system. The inlet end is positioned at a first end portion of the proboscis member. A blocking member is also provided which is movable relative to the proboscis member from a first position closing the entrance port to a second position opening the entrance port. A first spring member is provided which normally biases the blocking member to the position closing the inlet end. A first annular sealing member is provided above said at least one entrance port and at least two spaced annular sealing members disposed below the at least one entrance port, said at least two seals being spaced apart a predetermined distance, said first and said at least two annular sealing members providing a fluid tight seal between the proboscis member and the second valve assembly. When the first and second valve assemblies are urged toward each other for mating, fluid communication is formed so that the fluid will flow from said second fluid system to said first fluid system, and when the first and second valve assemblies are urged away from a mating relationship, the blocking member moves to close the entrance port end, and the proboscis member disengages from the second valve assembly thereby preventing flow of fluid between the first and second fluid systems.

BRIEF DESCRIPTION OF THE DRAWINGS

The foregoing, as well as other objects, features and advantages of our invention, will become more apparent from the appended figures, wherein like reference numerals denote like elements, and wherein.

DETAILED DESCRIPTION OF THE INVENTION

Figure 1:
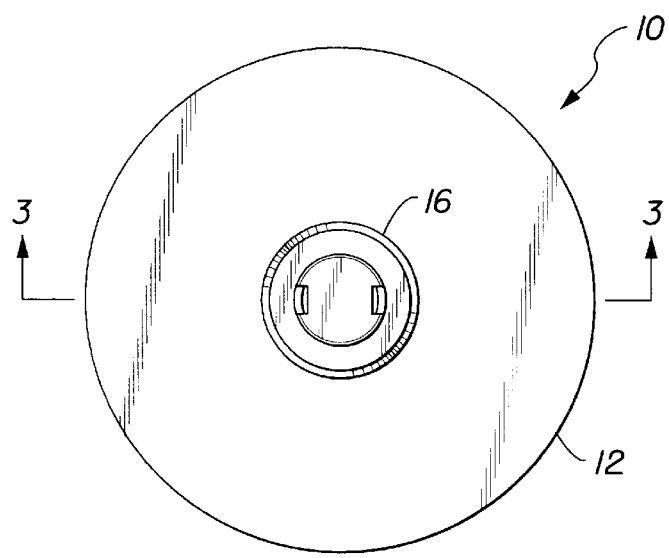
FIG. 1 is a top view of one embodiment of our valve assemblage when disengaged.
Figure 2:
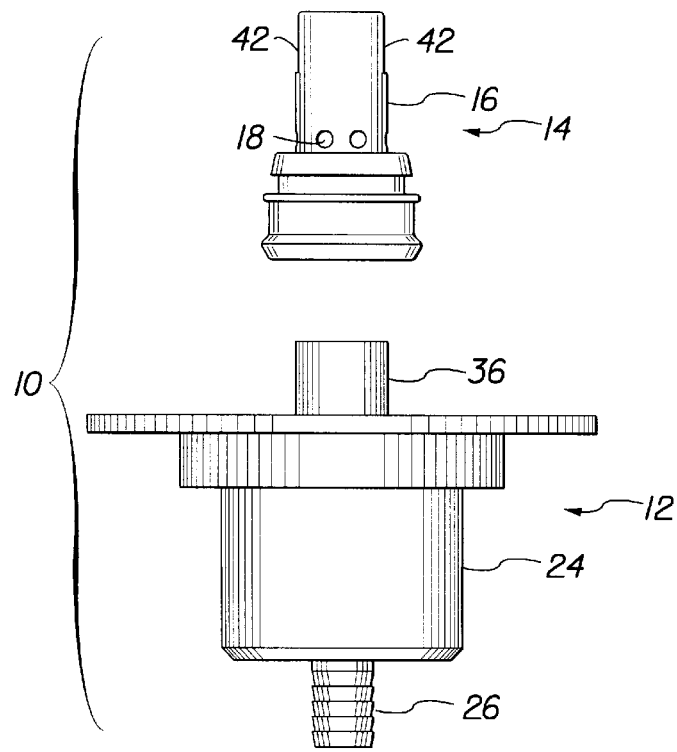
FIG. 2 is an elevational view of the valve assemblage of FIG. 1 when disengaged.
Figure 3:
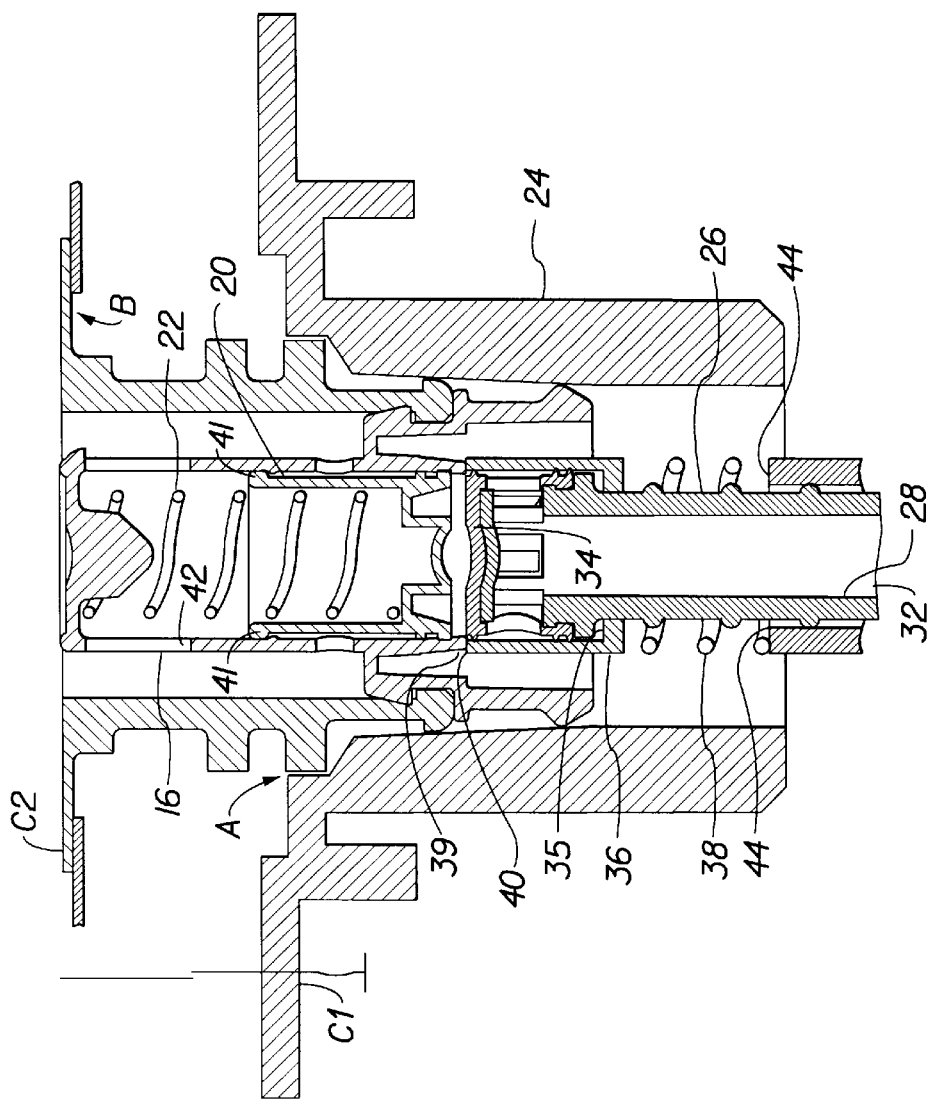
FIG. 3 is a sectional view along line 3—3 of FIG. 1 of the valve assemblage engaged in the closed position.
Figure 4:
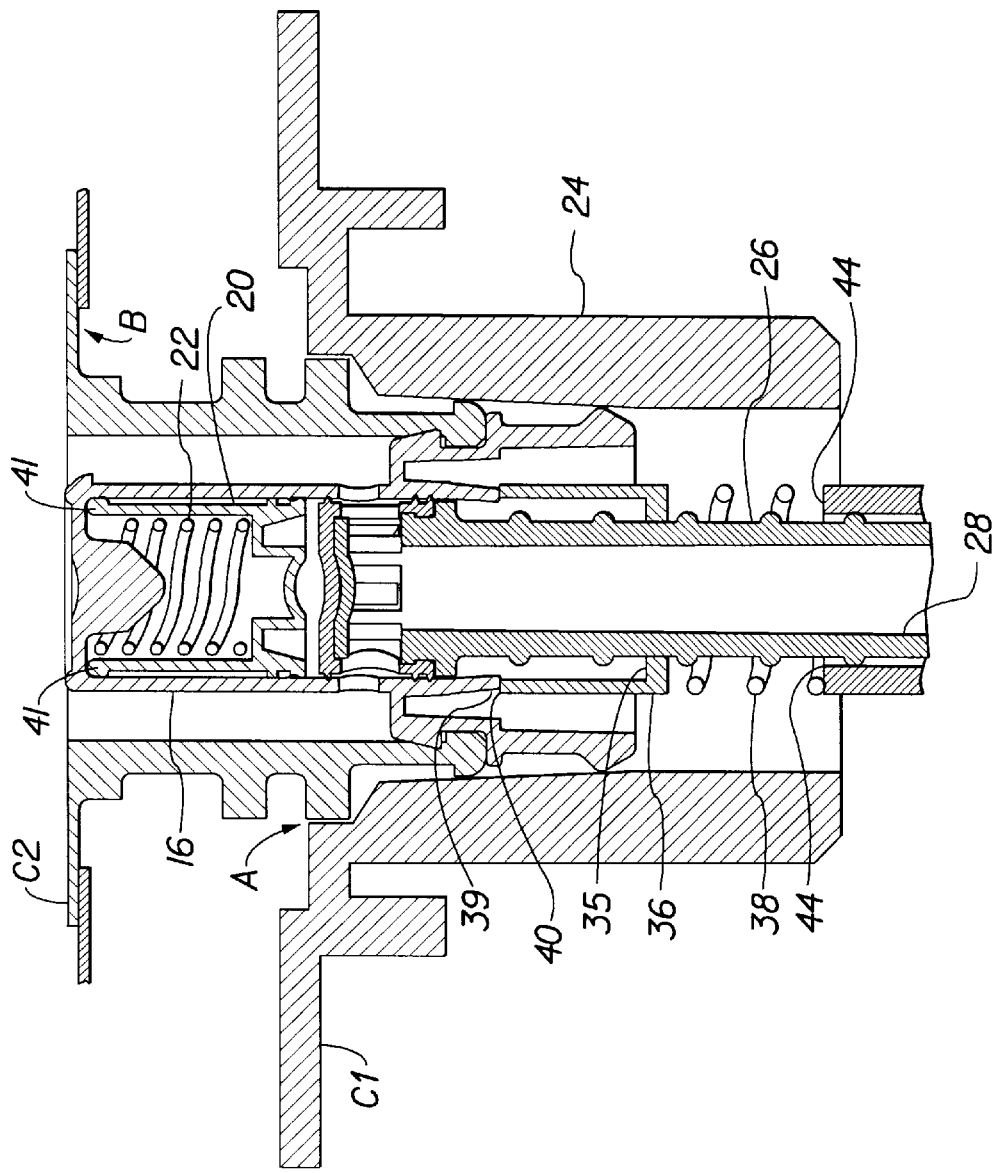
FIG. 4 is a sectional view similar to FIG. 3 illustrating the valve assemblage in the open position.
Figure 5:
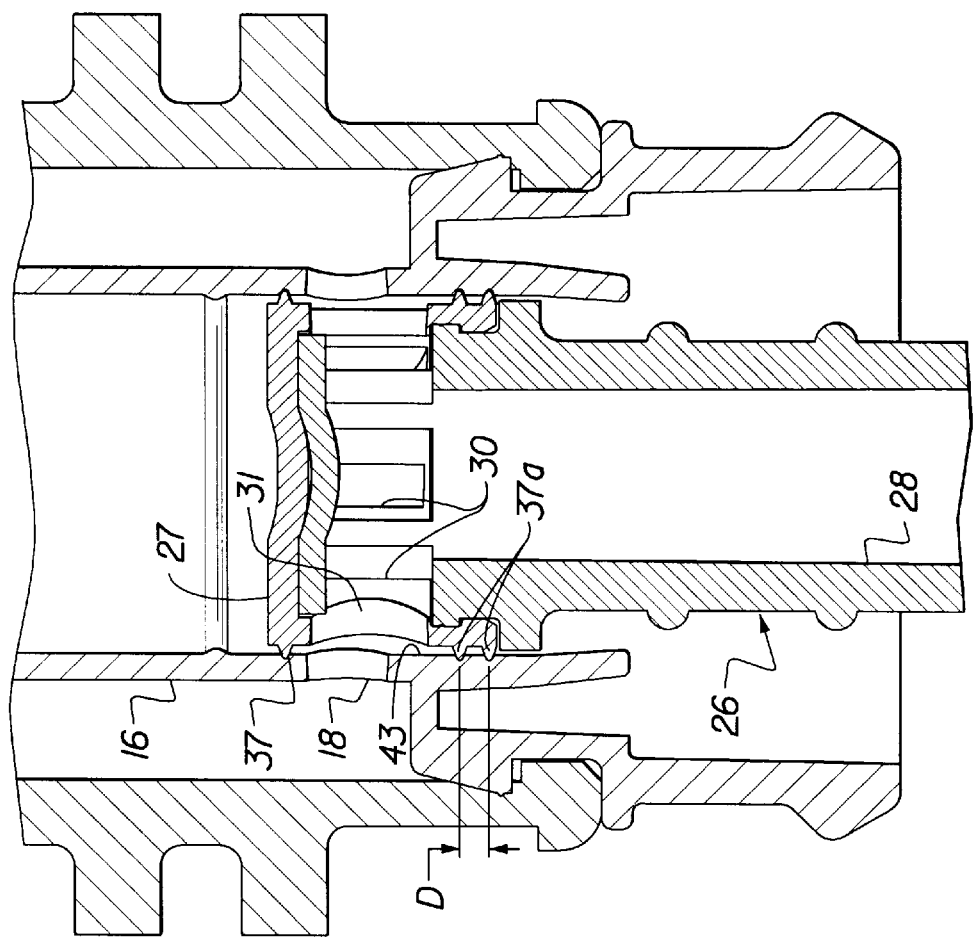
FIG. 5 is an enlarged partial elevational view of the proboscis member illustrated in FIG. 4.

FIGS. 1–5 illustrate one embodiment of a valve assemblage 10 of our invention. Valve assemblage 10 may comprise a first valve assembly 12 and a second valve assembly 14. As shown in FIGS. 2 and 3, assemblies 12,14 may be engaged to connect adjoining first and second fluid systems $C_1$ and $C_2$. System $C_1$ has a first opening A in which assembly 12 is mounted. System $C_2$ has a second opening B, in which assembly 14 is mounted. Second valve assembly 14 comprises a first body member or sleeve 16; a plurality of radially extended fluid inlet ports 18 to receive fluid from system $C_2$; a hollow piston 20 sealingly slidable within the body member 16 from a first position closing inlet ports 18 as shown in FIG. 3, to a second position opening entrance ports 18 as shown in FIGS. 4 and 5; and a spring member 22 captured between body 16 and piston 20 for normally biasing piston 20 to close ports 18. For ease of manufacture, ports 18 may be located as pairs on opposite sides of body 16, as indicated in FIGS. 1 and 4.

First valve assembly 12 may comprise a second body member 24, although member 24 is not required to practice the invention. An elongated proboscis member 26 is positioned concentrically within body member 24. Proboscis member 26 comprises a longitudinal channel 28 having a plurality of radial fluid entrance ports 30 to receive fluid from system $C_2$, and an open outlet end 32 to deliver the received fluid to system $C_1$. Entrance ports 30 are positioned at a closed end portion 34 of channel 28. A movable blocking member 36, preferably a sleeve, is slidably mounted telescopically around proboscis member 26 for selectively opening and closing entrance ports 30. A sealing cap 27 is provided over the upper end of proboscis 26. Sealing cap 27 has aligned openings 31, which align with entrance ports 30 for allowing of fluid to pass therethrough. Integrally formed as a part of sealing cap 27, there is provided a first resilient annular sealing member 37 positioned above the entrance ports 30 and a pair of annular sealing members 37a positioned below the entrance ports 30. The annular sealing member 37a are spaced apart a distance D so as to provide two separate spaced apart sealing areas below entrance ports 30 so as to minimize leakage of fluid between the first and second valve assemblies 12,14. The spacing of sealing members 37a a distance D apart assists in providing axial alignment between the proboscis member 26 and body member 16. The annular sealing members 37,37a are sized and shaped such that an annular seal will mate with the mating inner wall 43 of sleeve 16 (see FIG. 5). In the embodiment illustrated, sealing cap 27 is made of a relatively soft plastic material, which in the present example is a low density polyethelyene. The two annular sealing members 37a also provide additional rigidity to the sealing cap 27, thereby improving it's ability to be used repeatedly in a reliable manner. A spring member 38, captured between blocking member 36 and a shoulder 44 on proboscis 26, normally biases blocking member 36 to the position of FIG. 3 in which entrance ports 30 are closed or blocked. A radial flange 35 on blocking member 36 engages member 24 to limit movement of the blocking member.

Figure 6:
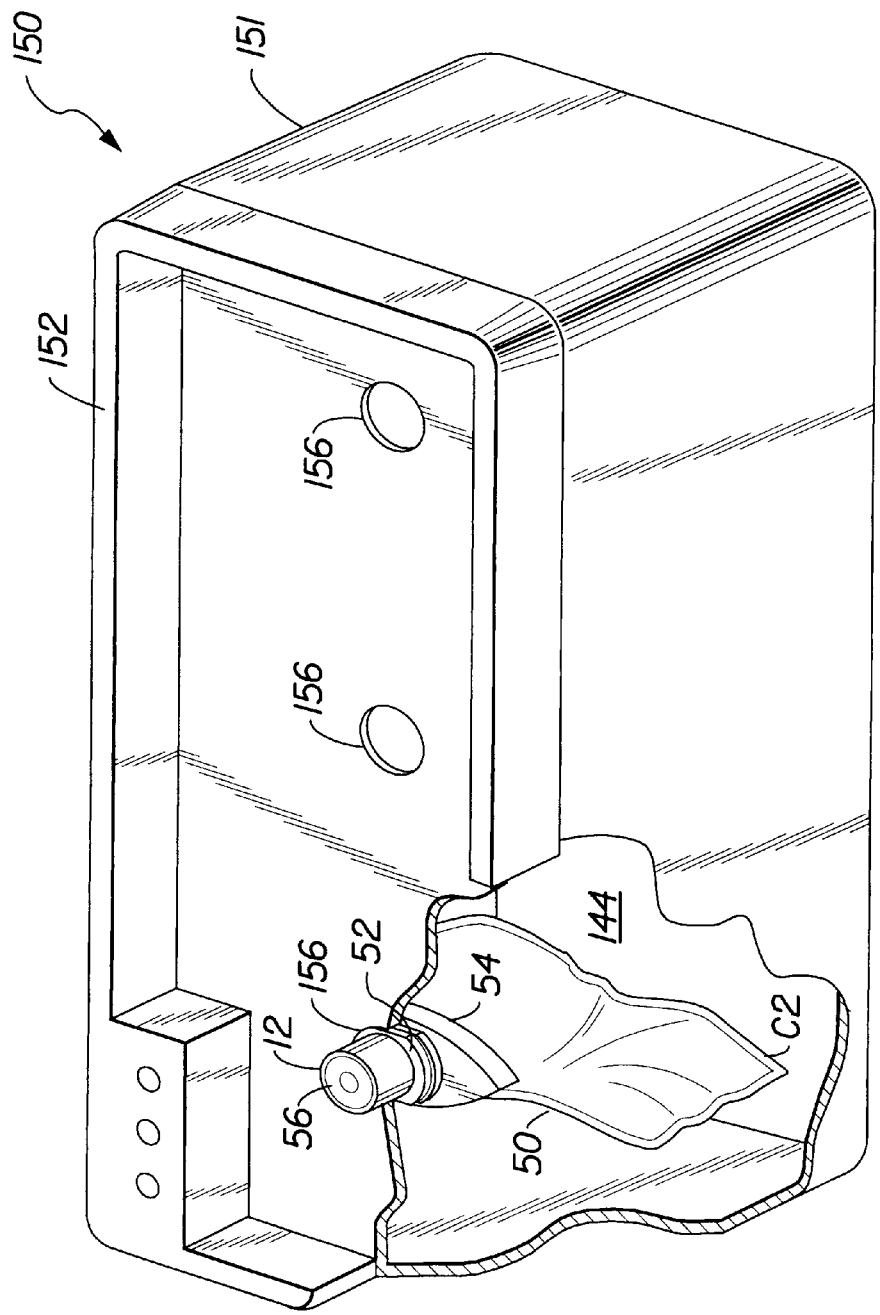
FIG. 6 is a perspective view of a container, partially cut away to show a bag and second valve member.

Referring to FIG. 6, the system $C_2$ is illustrated as comprising the cassette/rigid container 150 which includes a body portion 151 and a cover 152 for closing body 151. Interior compartment 144 is designed to contain a flexible bag 50 having a neck portion 52 surrounded in an opening 54 in the bag 50. A cap member 56 may be removably mounted on neck portion 52 for retaining valve assembly 12, the cap member 56 having an essential opening for access to valve assembly 12. The cassette includes an opening 156 to accommodate the neck portion 52 of the flexible bag 50. In the embodiment illustrated, three openings 156 are provided for receiving three bags 50. However, it is to be understood that the cassette 150 may include any number of flexible bags 50 as desired.

Figure 7:
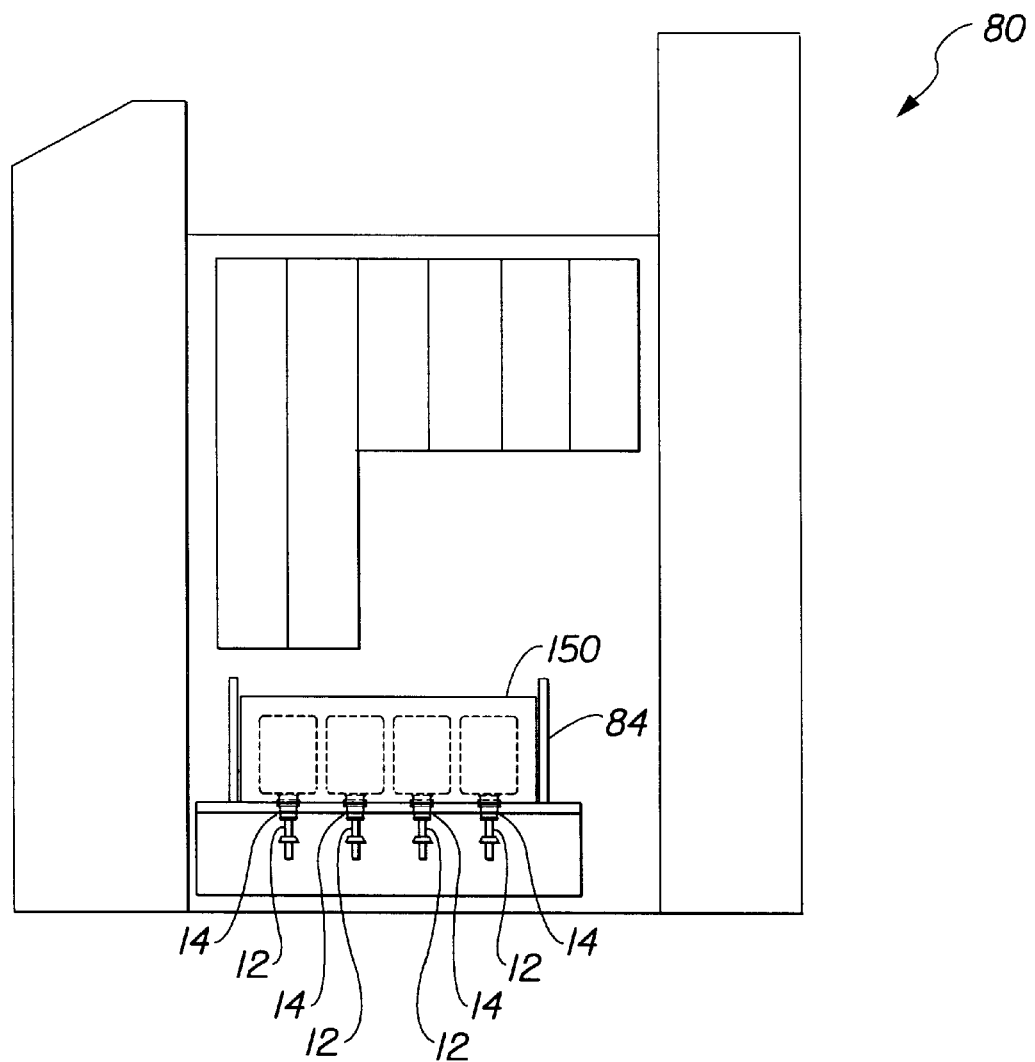
FIG. 7 is an elevational view of an apparatus having a plurality of first valve members for mating with a plurality of second valve members.

Referring to FIG. 7, there is illustrated a photographic apparatus 80 for developing of an exposed undeveloped photosensitive material, for example, film and/or paper. In a particular embodiment illustrated, photographic apparatus 80 comprises a minilab, however, the present invention is not limited to such. The apparatus 80 includes a plurality first valve assemblies 12, each designed to mate with an associated second valve assembly 14. In the embodiment illustrated, four valve assemblies are provided, however, any desired or required number of valve assemblies 12 may be provided. An appropriate mechanism 84 is provided for holding of a cassette 150 containing a plurality of bags 50, such as illustrated FIG. 7, in the inverted position such that when the cassette 150 is lowered, the second valve assemblies 14 of each bag 50 in cassette 150 will engage an associated first valve assembly 12 provided on apparatus 80.

The cassette 150 may be manually lowered or may be lowered through the use of a powered mechanical system, not shown. As previously discussed, the first valve assemblies 12 are designed for repeated engagement with a plurality of different valve assemblies 14 provided on different bags 50. As each fresh bag 50 is emptied, a new bag 50 containing fresh replenishment solution is provided. While the two valve assemblies 12,14 may be appropriately flexibly mounted to each of their respective fluid systems, if the valve assemblies 12,14 are not in precise axial alignment as originally designed, leakage may occur. This misalignment may occur as a result of many factors, for example, the cassette containing the bag 50 may not be seated properly, or one of the valve assemblies may be slightly mis-shaped. The two spaced seals 37a assist in minimizing the potential of leaks. If there is an axial misalignment between the two valve assemblies 12,14, the seals assist in correcting the misalignment and also at the same time maintains a sealing relationship with the proboscis member 26. The present invention is designed to solve these problems by providing two seal system which increases the sealing and improves on the alignment of the proboscis member of the second valve member with that of the first valve assembly.

When the valve assemblies 12,14 are urged toward each other in a mating relationship, a flared lip 39 of the body member 16 engages an exposed lip 40 on blocking member 36. Continued movement causes blocking member 36 to retract to the position of FIG. 4, thus opening entrance ports 30. At the same time, proboscis member 26 engages and displaces piston 20, thus opening inlet ports 18. Inlet ports 18 then are opposite opened entrance ports 30, thus forming an open fluid flow path from system $C_2$, though channel 28 to system $C_1$. Thus, liquid may flow from system $C_2$ to system $C_1$, or vice versa. For example, when system $C_2$ comprises a container for chemicals for a photographic processor, liquid may flow from system $C_2$ to system $C_1$, which may be such a processor.

To disengage valve assemblies 12,14 and terminate fluid flow between fluid systems $C_1$, $C_2$, the valve assemblies 12,14 are urged away from each other by moving one or the other, or both. Body member 16 of valve assembly 14 thus withdraws from engagement with blocking member 36 which then moves under the influence of spring 38 to close entrance ports 30. As proboscis member 26 disengages from valve assembly 12, piston 20 is freed to move under the influence of spring 22 to close entrance ports 18. In this latter position, a pair of radial stops 41 on piston member 20 engages bottom surfaces of a pair of slots 42 provided through a side wall of body member 16, thus preventing further movement of piston 20. Those skilled in the art will appreciate that other stopping means may be employed. In this way, the flow of fluid is prevented between fluid systems $C_1$, $C_2$.

Figure 8:
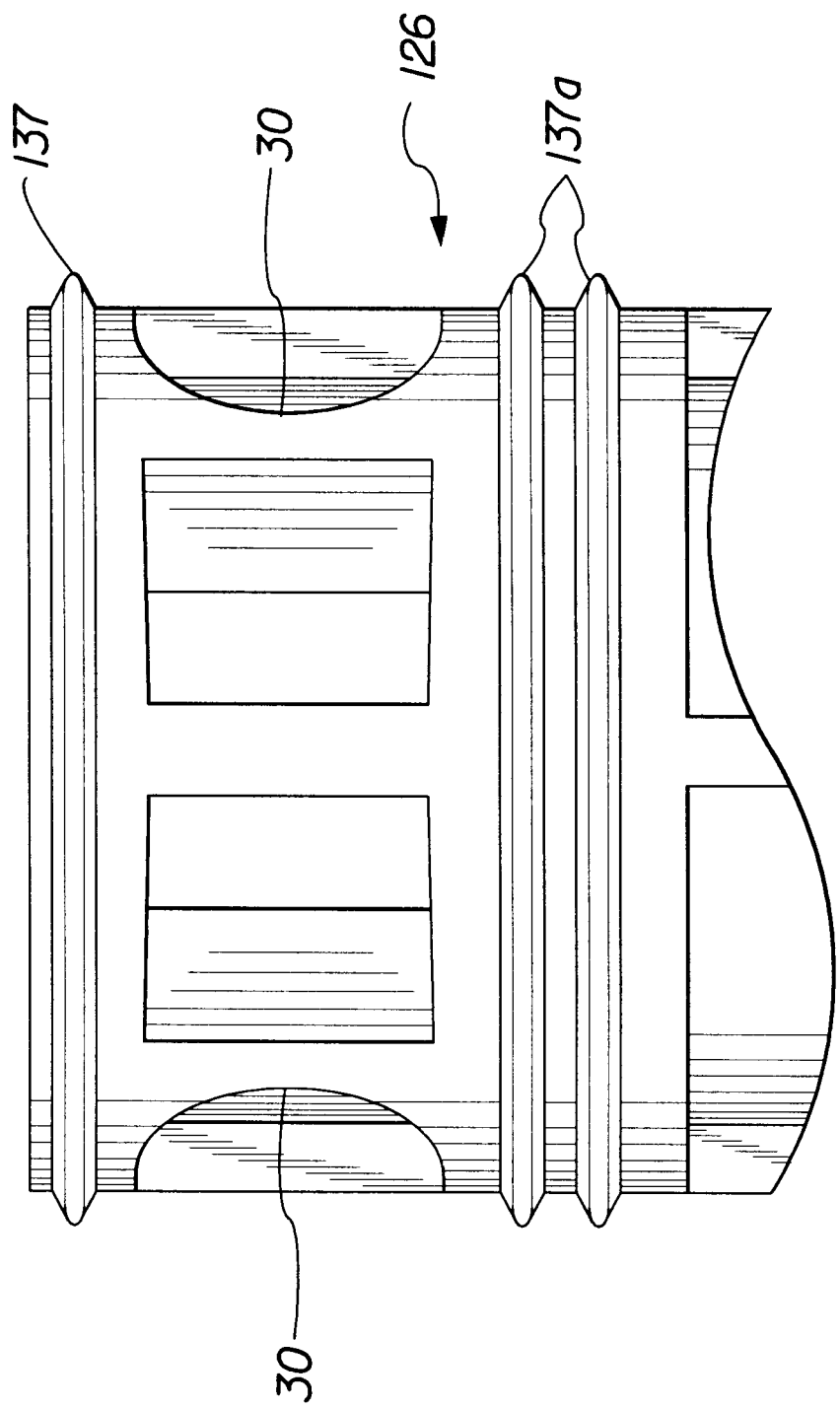
FIG. 8 is partial elevational view of a modified proboscis member made in accordance with the present invention.

In the embodiment illustrated in FIGS. 1–6, the sealing members 37, 37a are integrally formed as a part of sealing cap 27, however, the present invention is not so limited. Referring to FIG. 8, there is illustrated a partial view of a modified proboscis member 126 made in accordance with the present invention. Proboscis member 126 is similar to proboscis 26, like numbers representing like parts and operation. In this embodiment, instead of using a seal cap between the valve assembly 12 and valve assembly 14 for providing a sealing relationship, a plurality O-rings are used. In particular, a first O-ring 137 is seated in an annular recess provided in proboscis member 26 above entrance ports 30 and a pair of spaced O-rings 137a are provided below the ports 30, each also being seated in an annular recess provided in proboscis member 26.

It is to be understood that various changes and modifications may be made without departing from the scope of the present invention, the present invention being described by the following claims.

| PARTS LIST | |
|---|---|
| A | first opening |
| B | second opening |
| $C_1$ | first fluid system |
| $C_2$ | second fluid system |
| 10 | valve assemblage |
| 12 | first valve assembly |
| 14 | second valve assembly |
| 16 | first body member or sleeve |
| 18 | fluid inlet ports |
| 20 | hollow piston |
| 22 | spring member |
| 24 | second body member |
| 26 | proboscis member |
| 27 | sealing cap |
| 28 | longitudinal channel |
| 30 | fluid entrance ports |
| 31 | aligned openings |
| 32 | open outlet end |
| 34 | closed end portion |
| 35 | flange |
| 36 | movable blocking member |
| 37 | annular sealing members |
| 37a | sealing members |
| 38 | spring member |
| 39 | flared lip |
| 40 | exposed lip |
| 41 | radial stops |
| 42 | pair of slots |
| 43 | mating inner wall |
| 44 | shoulder |
| 50 | flexible bag |
| 52 | neck portion |
| 54 | opening |
| 56 | cap member |
| 80 | photographic apparatus |
| 84 | mechanism |
| 126 | modified proboscis member |
| 137 | O-ring |
| 137a | spaced O-rings |
| 144 | interior compartment |
| 150 | cassette/rigid container |
| 151 | body portion |
| 152 | cover |
| 156 | openings |

What is claimed is:

1. A valve assemblage for controlling flow of fluid between a first fluid system and a second fluid system, said second fluid system containing a fluid to be dispensed to said first fluid system, the assemblage comprising:

a first valve assembly comprising a proboscis member comprising a proboscis member having channel, an inlet end to receive fluid and an outlet end to deliver the received fluid to the first fluid system, the inlet end being positioned at a first end portion of a proboscis member and having at least one entrance port, a blocking member movable relative to proboscis member from the first position closing the at least one entrance port end to a second position opening the at least one entrance port, and a first spring member normally biasing the blocking member to the position closing the at least one entrance port, a first annular sealing member is provided above said at least one entrance port and at least two spaced annular sealing members disposed below the at least one entrance port, second at least two seals being spaced apart a predetermined distance, said first and said at least two annular sealing members providing fluid tight seal between the proboscis member and the second valve assembly, a second valve assembly adapted to engage said first valve assembly, said second valve assembly comprising a body member, a fluid inlet port in the body to receive fluid from the second fluid system, a piston slidable within a body member from the first position closing the inlet port to a second position opening the closed inlet port, and a second spring member normally biasing the piston to the first position;

wherein when the first and second valve assemblies are urged toward each other, the body member of the second valve assembly engages and moves the blocking member there by opening the inlet end of the proboscis member, and the proboscis member displaces the piston into the position opening the entrance port, the opened entrance port then being in fluid communication with the opened inlet end, thereby forming an open fluid flow channel between the first system and the second system; and wherein when the first and second valve assemblies are moved away from each other, the body member is withdrawn from the proboscis member, the blocking member moves to close the inlet end, and the proboscis member disengages from the piston to allow the piston to slide to the position closing the entrance port, thereby preventing flow of fluid between the first and second systems.

2. The valve assembly according to claim 1 wherein a seal cap is provided over the inlet end, said first annular sealing member above said entrance port and said at least two annular sealing members below the entrance port are integrally formed as a part of said sealing cap.

3. The valve assembly according to claim 2 wherein said sealing cap is made of a low density polyethylene.

4. The valve assembly according to claim 1 wherein each of said at least two annular sealing members below the entrance port comprises an O-ring.

5. A photofinishing apparatus having a first fluid system having a first valve assembly adapted to engage a second valve assembly on a container of a second fluid system, said container having a fluid therein to be transferred from said second fluid system to said first fluid system, said first valve assembly comprising a proboscis member having a channel, an inlet end having an entrance port to receive said fluid and an outlet end to deliver the received fluid to the first fluid system, the inlet end being positioned at a first end portion of the proboscis member, a blocking member movable relative to the proboscis member from a first position closing the entrance port to a second position opening the entrance port, and a first spring member normally biasing the blocking member to the position closing the inlet end, a first annular sealing member is provided above said at least one entrance port and at least two spaced annular sealing members disposed below the at least one entrance port, said at least two seals being spaced apart a predetermined distance, said first and said at least two annular sealing members providing fluid tight seal between the proboscis member and the second valve assembly;

said second valve assembly comprising a body member, a fluid inlet port in the body to receive fluid from the second fluid system, a piston slidable within a body member from the first position closing the inlet port, to a second position opening the closed inlet port, and a second spring member normally biasing the piston to the first position;

wherein when the first and second valve assemblies are urged toward each other for mating, the body member of the second valve assembly engages and moves the blocking member thereby opening the entrance port of the proboscis member, and the proboscis member displaces the piston into the position opening the inlet port, the opened inlet port then being in fluid communication with the entrance port, thereby forming an open fluid flow channel between the first fluid system and the second fluid system; and wherein when the first and second valve assemblies are urged away from a mating relationship, the body member is withdrawn from the proboscis member, the blocking member moves to close the entrance port end, and the proboscis member disengages from the piston to allow the piston to slide to the position closing the inlet port, thereby preventing flow of fluid between the first and second fluid systems.

6. The photofinishing apparatus according to claim 5 wherein a seal cap is provided over the inlet end, said first annular sealing member above said entrance port and said at least two annular sealing members below the entrance port are integrally formed as a part of said sealing cap.

7. The photofinishing apparatus according to claim 6 wherein said sealing cap is made of a low density polyethylene.

8. The photofinishing apparatus according to claim 5 wherein each of said at least two annular sealing members below the entrance port comprises an O-ring.

9. A photofinishing apparatus having a first fluid system having a first valve assembly adapted to engage a second valve assembly on a container of a second fluid system, said container having a fluid therein to be transferred from said second fluid system to said first fluid system, said first valve assembly comprising a proboscis member having a channel, an inlet end having an entrance port to receive said fluid and an outlet end to deliver the received fluid to the first fluid system, the inlet end being positioned at a first end portion of the proboscis member, a blocking member movable relative to the proboscis member from a first position closing the entrance port to a second position opening the entrance port, and a first spring member normally biasing the blocking member to the position closing the inlet end, a first annular sealing member is provided above said at least one entrance port and at least two spaced annular sealing members disposed below the at least one entrance port, said at least two seals being spaced apart a predetermined distance, said first and said at least two annular sealing members providing fluid tight seal between the proboscis member and the second valve assembly;

wherein when the first and second valve assemblies are urged toward each other for mating, fluid communication is formed so that the fluid will flow from said second fluid system to said first fluid system; and wherein when the first and second valve assemblies are urged away from a mating relationship, the blocking member moves to close the entrance port end, and the proboscis member disengages from the second valve assembly thereby preventing flow of fluid between the first and second fluid systems.

10. The photofinishing apparatus according to claim 9 wherein a seal cap is provided over the inlet end, said first annular sealing member above said entrance port and said at least two annular sealing members below the entrance port are integrally formed as a part of said sealing cap.

11. The photofinishing apparatus according to claim 10 wherein said sealing cap is made of a low density polyethylene.

12. The photofinishing apparatus according to claim 9 wherein each of said at least two annular sealing members below the entrance port comprises an O-ring.

* * * * *